United States Patent
Emerson et al.

(10) Patent No.: US 6,594,357 B1
(45) Date of Patent: Jul. 15, 2003

(54) SYSTEM AND METHOD OF REGISTERING THE IDENTITY OF A TELEPHONE TERMINAL IN ASSOCIATION WITH THE IDENTITY OF A COMPUTER TERMINAL

(75) Inventors: Derek J Emerson, Suffolk (GB); Robert G Brockbank, Suffolk (GB)

(73) Assignee: British Telecommunications public limited company, London (GB)

( * ) Notice: Subject to any disclaimer, the term of this patent is extended or adjusted under 35 U.S.C. 154(b) by 0 days.

(21) Appl. No.: 09/623,315
(22) PCT Filed: Mar. 29, 1999
(86) PCT No.: PCT/GB99/00983
§ 371 (c)(1), (2), (4) Date: Aug. 31, 2000
(87) PCT Pub. No.: WO99/51015
PCT Pub. Date: Oct. 7, 1999

(30) Foreign Application Priority Data

Mar. 31, 1998 (EP) .............................. 98302500

(51) Int. Cl.⁷ ........................ H04M 3/42; H04M 3/523; H04M 11/00
(52) U.S. Cl. .............................. 379/265.04; 379/93.07; 379/93.12; 379/903
(58) Field of Search ................................. 370/352, 401; 379/90.01, 93.07, 93.09, 93.12, 93.14, 93.17, 93.23, 93.24, 93.25, 265.09, 265.11, 267, 265.04, 903

(56) References Cited

U.S. PATENT DOCUMENTS

| | | | |
|---|---|---|---|
| 5,652,788 A | 7/1997 | Hara | 379/156 |
| 6,130,933 A | * 10/2000 | Miloslavsky | 370/352 |

FOREIGN PATENT DOCUMENTS

| | | | |
|---|---|---|---|
| WO | WO 97/28635 | 8/1997 | 379/90.01 |

* cited by examiner

Primary Examiner—Harry S. Hong
(74) Attorney, Agent, or Firm—Nixon & Vanderhye P.C.

(57) ABSTRACT

In a Computer Telephony Integration environment, to reduce the risk of inadvertent or fraudulent registration of the association of a user's computer terminal with the wrong telephone, i.e. one other than the telephone adjacent to the computer terminal or the user's mobile telephone, a host computer instructs the user via a screen display to call a particular extension of a CTI-enabled PABX. When a call to that extension is detected, the PABX treats the call as having been answered, and reports this to the host computer. The user is now instructed to dial a codeword, and when this is received at the PABX and reported to the host computer, the telephone is registered as associated with the computer terminal provided that the reported codeword matches the codeword provided to the user. A number of variants and refinements provide for greater security against fraudulent registration.

5 Claims, 2 Drawing Sheets

SYSTEM AND METHOD OF REGISTERING THE IDENTITY OF A TELEPHONE TERMINAL IN ASSOCIATION WITH THE IDENTITY OF A COMPUTER TERMINAL

BACKGROUND OF THE INVENTION

This invention relates to a Computer Telephony Integration (CTI) environment wherein, for example, a user can enter a command at his computer terminal for a call to be made to a destination number.

DESCRIPTION OF RELATED ART

Examples of such CTI environments are disclosed in the articles "Introduction to Computer Telephony Integration", by A. Catchpole, G. Crook, and D. Chesterman, British Telecommunications Engineering, July 1995; "Computer Telephony Integration—The Meridian Norstar", by A. Catchpole, British Telecommunications Engineering, October 1995; "Computer Telephony Integration—The Meridian 1 PBX", by P. Johnson, A. Catchpole, and L. Booton, British Telecommunications Engineering, July 1996; "Callscape—Computer Telephony Integration for the Small Business", by G. Hillson, G. Hardcastle, and M. Allington, British Telecommunications Engineering, January 1997, and "Call Centres—Doing Business by Telephone" by M. Bonner, British Telecommunications Engineering, July 1994.

CTI is particularly useful in call centres, and International Application Number PCT/GB96/00727 (Publication Number WO 96/31044) in the name of BRITISH TELECOMMUNICATIONS public limited company (BT) discloses an ACD suite in a call centre such as BT's national telephone account management operation.

In such a call centre, if an agent wants to be connected to the number of a target customer, for example a potential customer in a telesales mode of the call centre, the agent sends a "make call" command to the call control apparatus. If the agent is allowed to specify a desired number, referred to as the target number, then he will insert this into the command. Otherwise, upon receipt of a make call command that does not contain a target number, the call control apparatus will generate a suitable number using a sales program as is known in the art. The call control apparatus will then send to the switching system a command containing a target number and the number of an extension which is to be joined to the external call to the target customer. The extension and the target customer are now connected together by the switching system so that the agent may speak to the target customer. Depending upon the control program of the switching system, this is effected by any one of a number of known ways. For example, in one way the switching system makes an external call to the supplied target number, and, when the target customer answers, then makes a call to the extension, and joins the two calls when the agent answers the call to the extension, and in another way the switching system makes a single call from the extension to the target number.

If the call control apparatus has registered an association between the agent and an extension number other than the number of the telephone terminal that is associated with the computer terminal to form a workstation, as is known in the art, then the wrong agent will be connected to the target customer.

BRIEF SUMMARY OF THE INVENTION

In accordance with a first aspect of the present invention, there is provided a method of registering the identity of a telephone terminal in association with the identity of a computer terminal, the method comprising the steps of:

providing to a user of the computer terminal, via that computer terminal, the identity of a predetermined destination terminal number;

answering a call made to that predetermined destination terminal number;

receiving at that predetermined destination terminal number the identity of a telephone terminal from which that call was made;

providing to the user, via that computer terminal, a codeword;

receiving at that predetermined destination terminal data provided by the user via that telephone terminal;

comparing the received data with the provided codeword; and if there is a match, registering the identity of that telephone terminal in association with the identity of that computer terminal.

The secure registration in accordance with the present invention of a telephone terminal with a computer terminal brings advantages in a number of fields.

In a call centre, since the call control apparatus registers the identity of the telephone terminal that makes the call, herein referred to as a registration call, to the predetermined destination terminal number, in this particular case an extension of the switching system, it will normally be only the agent at the computer terminal who will know the codeword, e.g. from the screen display, and who will make the registration call from his chosen terminal, which may be the extension at the workstation, or it may be his mobile telephone. Therefore, unless a situation is contrived in which a registration call, using that particular codeword, is made to the predetermined extension from a terminal other than a terminal which will be normally answered by the agent, the call control apparatus will always register the correct telephone terminal identity in association with the computer terminal and the agent identity.

In a conventional office environment, a user can use his computer terminal to request an outgoing call, and a CTI controller will command a PABX serving the office to make a call from the extension registered in association with that computer terminal.

The present invention also makes receipt of incoming calls secure. For example, a remote originator can either request registration information from a user's computer terminal, or be sent it unsolicited, and make a call to the telephone number of that registration information, i.e. the identity of the telephone terminal associated with that computer terminal. Depending upon the particular commands used in the signalling protocol, the identity of the telephone terminal may be the sole information in a message sent to the remote originator, or it may be associated with other information.

The registration information may be stored in the computer terminal, or it may be stored remote from the computer terminal, for example in a host computer associated with the computer terminal.

The step of providing the identity of a predetermined destination terminal number may be performed upon detection of a make call command made via that computer terminal.

In accordance with a second aspect of the present invention, there is provided a system for registering the identity of a telephone terminal in association with the identity of a computer terminal, the system comprising:

means to provide to a user of the computer terminal, via that computer terminal, the identity of a predetermined destination terminal number;

means to answer a call made to that predetermined destination terminal number;

means to receive the identity of a telephone terminal from which that call was made;

means to provide to the user, via that computer terminal, a codeword;

means to receive data provided by the user via that telephone terminal;

means to compare the received data with the provided codeword; and means responsive to a match between the received data and the provided codeword to register the received identity of that telephone terminal in association with the identity of that computer terminal.

The means to provide the identity of a predetermined destination terminal number may be arranged such as to provide said identity of a predetermined destination terminal number upon detection of a make call command invoked by the user.

The means to provide the identity of a predetermined destination terminal number; the means to provide to the user, via that computer terminal, a codeword; the comparing means; and the registering means together may constitute a subsystem; and the answering means; the means to receive the identity of a telephone terminal; and the means to receive data provided by the user together may constitute a separate subsystem.

BRIEF DESCRIPTION OF THE DRAWINGS

Specific embodiments of the invention will now be described by way of example with respect to the accompanying drawings in which.

DETAILED DESCRIPTION OF EXEMPLARY EMBODIMENTS OF THE INVENTION

Figure 1:
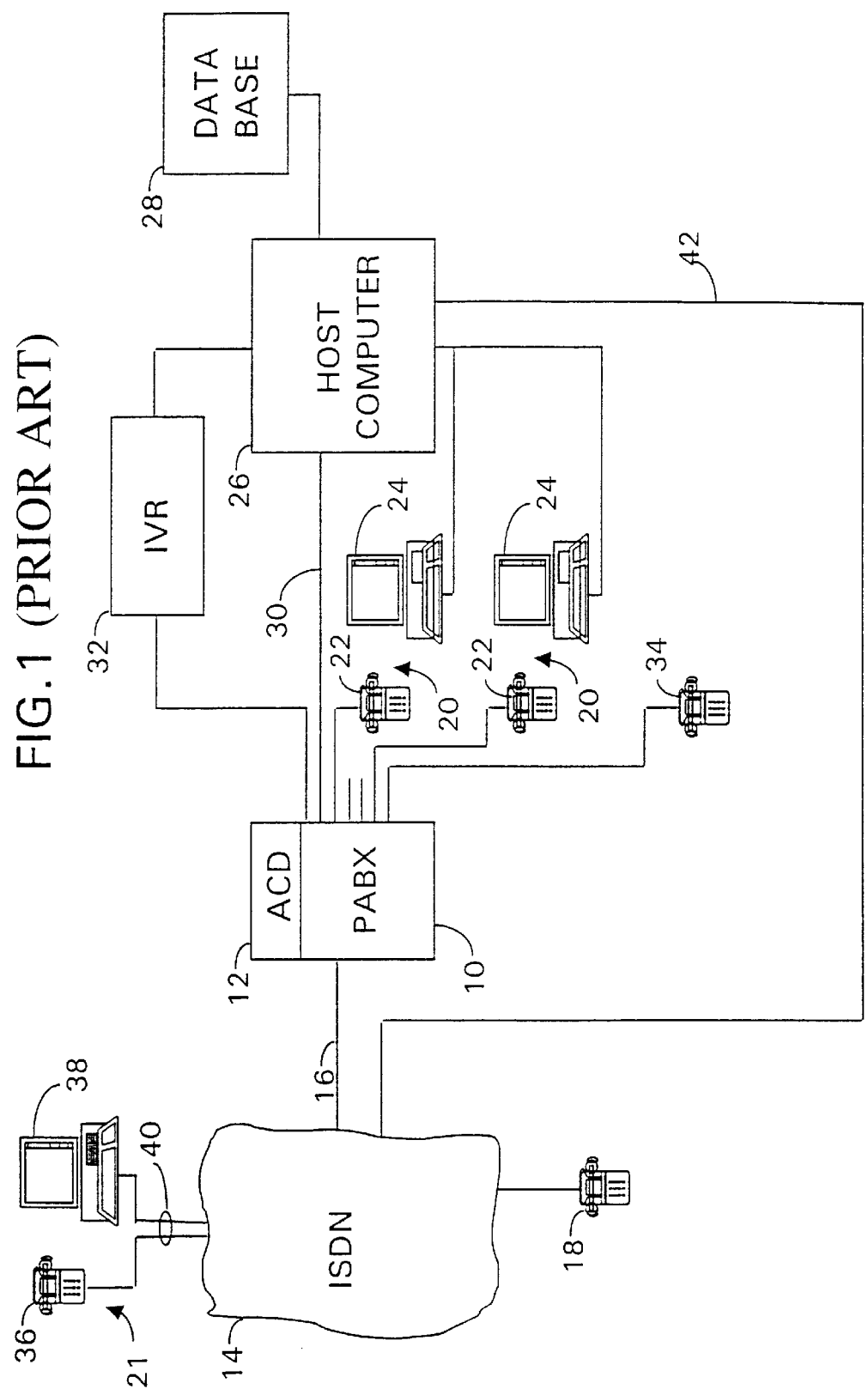
FIG. 1 shows a known ACD suite.

In FIG. 1 there is shown a known ACD suite used in a call centre such as British Telecommunications' national telephone account management operation. The ACD suite and its operation is described in detail in International Application Number PCT/GB96/00727 (Publication Number WO 96/31044) and for the purposes of the present invention will be described only briefly in respect of its component parts, and relevant operational characteristics.

The suite comprises a PABX 10, constituting a switching system of the present invention, associated with an ACD system 12 and connected to an Integrated Services Digital Network (ISDN) 14 by a primary rate ISDN link 16 having thirty 64 kbit/s channels. Customers, represented by telephone terminal 18, can make calls to the call centre by dialling the published directory number, also referred to as a national number or a destination terminal number, of the call centre. These incoming calls are received at the PABX 10 and placed in a queue by the ACD system 12. The ACD system 12 in known manner allocates the call at the head of that queue to a selected one of a plurality of call centre agent positions. The agents are either call centre-based at positions 20 (also referred to as workstations), each comprising a telephone terminal 22 (also referred to as an ACD turret) and an associated computer terminal 24, or they are teleworking agents, represented by remote workstation 21 comprising telephone terminal 36 and associated computer terminal 38.

Each computer terminal 24 is constituted by a personal computer, commonly referred to as a PC, and is connected to a host computer 26 having an associated database 28 and connected to the PABX 10 via a CTI link 30. An interactive voice response system (IVR) 32 is connected to a port of the PABX 10 and to the host computer 26, and is arranged to obtain data from customers, and teleworking agents, and to pass this to the host computer 26 for processing as appropriate. In FIG. 1 only two workstations 20 are shown although in a call centre of a large company there may be in the region of a hundred workstations 20. In variants, the computer terminals 24 are dumb terminals and rely on the processing power of the host computer 26.

The location of a remote workstation 21 could be one of a variety of places. For the purpose of this example it will be assumed that the remote workstations 21 are located in the private residences of teleworking agents, and are connected to the ISDN 14 via respective basic rate ISDN links 40. The ISDN links 40 provide two independent 64 kbit/s (B) channels and a 16 kbit/s (D) data channel. Thus calls can be made and charged independently from each of the terminals 36 and 38. The host computer 26 is connected to the ISDN 14 via a primary rate ISDN link 42. In variants the link 42 is a basic rate ISDN link.

When an agent starts a work period at a workstation 20, or at a remote workstation 21, he or she logs on to the ACD system 12 using the TouchTone (Registered Trade Mark) keypad of the telephone terminal 22, 36. Alternatively, the log on procedure can be performed via the computer terminal 24, the host computer 26 and the CTI link 30, or via the computer terminal 38, the ISDN 14, the link 42, the host computer 26 and the CTI link 30.

The host computer 26, constituting a call control apparatus of the present invention, is programmed to monitor activity of the call control processor (not shown) of the PABX 10 and to send command messages to the call control processor as will be described below.

The host computer 26 contains a list of the identities of, say, ten virtual terminals 34 which are designated as virtual turrets for teleworking only and have no physical existence. In this example, the PABX 10 is configured so that it has a set of port identities corresponding to the identities of the virtual terminals 34, these port identities not being associated with any physical ports of the PABX 10 and being merely virtual ports. In other words, the call control processor will command connection of the ringing current generator to a selected virtual port under the control of the ACD 12, and cease the connection under the control of the host computer 26, but the PABX 10 will not be aware that these virtual ports have no physical existence.

In order to support teleworking, the ACD system 12 must still associate a teleworking agent's identity with the identity of what it deems to be an active terminal 22 in the call centre, and the manner in which this is achieved will now be described.

In a first situation, a teleworking agent will activate his or her computer terminal 38 which will autodial the directory number of the host computer 26. A connection (using one of the B channels) may be established via the ISDN 14.

A teleworking agent logs on to the host computer 26 using an identification protocol including informing the host computer 26 of the directory number being currently used by the teleworking agent, and the host computer 26 will store the teleworking agent's directory number in association with the identity of the teleworking agent.

The host computer 26 will now select an available terminal 34 from its list of virtual turrets, associate the teleworking agent's identity with the identity of the selected terminal 34, and send them to the ACD system 12 via the CTI link 30. The host computer 26 now has a record associating the identity of the agent, the identity of the remote terminal, and the identity of the selected terminal 34 and can upon interrogation by the identity of a terminal 34 retrieve the identity of the corresponding remote terminal.

The ACD system 12 now includes within its list of active agents, an entry for that selected terminal 34 associated with the teleworking agent's identity, and when the ACD system 12 allocates that selected terminal 34 to receive an incoming call, the PABX 10, under the control of the ACD system 12, attempts to connects the call to the corresponding virtual port.

respective line card (not shown) and applies ringing current to the selected terminal 34 and ringing tone to the incoming call, The host computer 26 detects that the PABX 10 has connected a call to a virtual port which is recorded as being a teleworking virtual terminal, and responds by commanding the PABX 10 to treat the selected terminal 34 as having gone off-hook, i.e. as being answered, and thereby cease applying ringing current to it, and to make an outgoing call to the directory number associated with the selected terminal 34 in the record stored in host computer 26, this being the teleworking agent's telephone.

When the host computer 26 detects that the PABX 10 has registered that the remote teleworking agent has answered this outgoing call, the host computer 26 then instructs the PABX 10 to join the incoming call to the outgoing call, by for example a conference bridge.

The ACD system 12 could be an integral part of the call control process of the PABX 10 or could be a separate entity and coupled to the PABX 10 via a suitable link.

Figure 2:
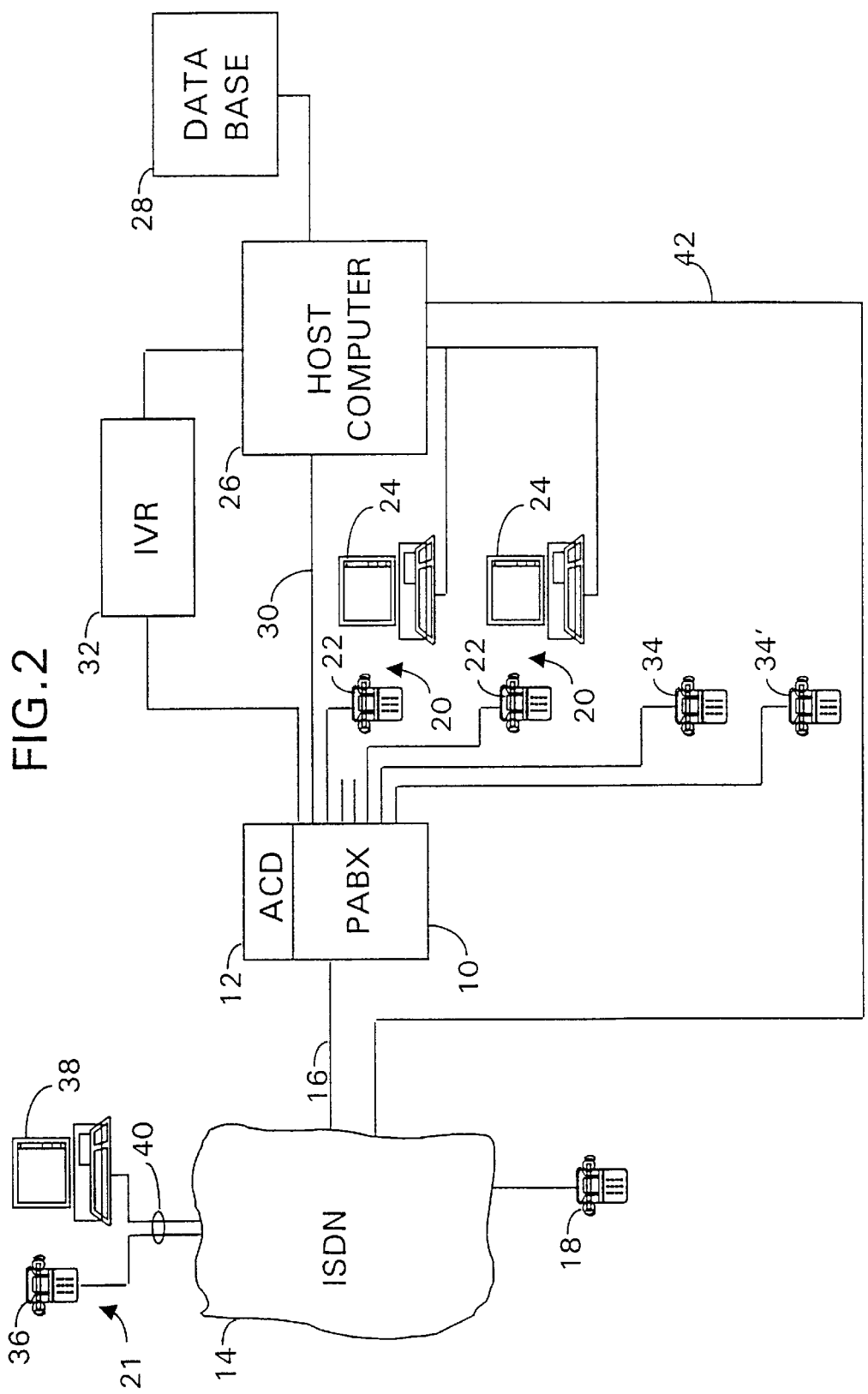
FIG. 2 shows an embodiment of the present invention.

As shown in FIG. 2, the PABX 10 has a further virtual terminal 34', identical with a terminal 34 but not forming part of the set of virtual terminals 34 used by the host computer 26 in association with the identities of teleworking agents, as described above.

The secure registration of telephone terminal/computer terminal association of the present invention is effected as follows.

Consider first the situation of a local agent, i.e. one working at a workstation 20 whose telephone is directly connected to a port of the PABX 10. The host computer 26 is arranged to respond to initiation of a log on procedure by the agent via the keyboard of the computer terminal 24 at his workstation 20 to send to that computer terminal 24 data for a screen display containing a text message "Please dial extension XXXX. When the call is answered, please enter via your telephone keypad the codeword YYYY.".

The agent now responds to the message by dialling on his telephone 22, referred to herein as making a registration call, the extension XXXX, which is the extension number corresponding to the virtual terminal 34', and the PABX 10 responds in normal manner by connecting ringing current to the corresponding port. The host computer 26 knows, via the CTI link 30, that the virtual terminal 34' is "ringing", and instructs the PABX 10 to treat the call as answered by recording the corresponding line circuit as being in "off hook" condition, and to report any digits received at the PABX 10 for that call.

The PABX 10 is arranged, in known manner, to collect digits dialled during the call, i.e. any keypresses made by the user, including "*" and "#". In a variant, the PABX 10 connects a digit collector, not shown, to the virtual terminal 34'.

Upon receipt of a message from the PABX 10 containing the digits received from the agent, and the extension number of the telephone 22 from which they were sent, the host computer 26 compares these received digits with the code sent in the screen display information, and, if they match, stores the extension number in association with the identity of the computer terminal 24 and sends a further screen display to the computer terminal 24 containing the text message "Please hang up.". The agent has now been registered at the host computer 26 in association with his telephone terminal 22 and his computer terminal 24.

In a variant, the host computer 26 sends to the computer terminal 24 data for a first screen display containing a text message "Please dial extension XXXX.", and commands the PABX 10 to answer the call and report back to the host computer 26 the identity, i.e. the extension number or calling line identity (CLI), of the terminal that makes that call to the extension XXXX. On receipt of this identity the host computer 26 records this identity in association with the identity of the computer terminal 24, and sends data for a second screen display containing a text message "Please enter via your telephone keypad the codeword YYYY.". This provides increased security by making it more difficult for an errant agent to cooperate with a collaborator to attempt to register a telephone which is remote from the computer terminal instead of the telephone which is adjacent to that computer terminal. If the codeword is not sent to the computer terminal until a telephone is detected as having established a connection with the extension XXXX, then the agent at the computer terminal will not be able to make a telephone call via the PABX 10 to the collaborator at that remote telephone to pass the codeword.

In a refinement of this last-mentioned variant, the host computer 26 starts a timeout of a few seconds when it sends the second screen display and ignores any digits received from the PABX 10 after the timeout has matured.

In another variant in which the computer terminal 24 has a sound card and a loudspeaker, or a pair of loudspeakers, the host computer 26 sends the first screen message as mentioned above, and upon receipt of the identity of the terminal that makes the call to the extension XXXX, sends a screen message "Place the telephone handset against the computer loudspeaker, and press any key.". In response to the key press made by the agent the host computer 26 now sends a command to that computer terminal to generate the codeword as an audio signal using standard MF4 (multi-frequency) signalling tones. The PABX 10 receives these tones and treats them in the same manner as tones generated by key presses on the telephone instrument, i.e. decodes them using its digit collector. This provides a further level of security in that only a telephone terminal, either fixed or mobile, at that computer terminal can be used to relay the codeword to the extension XXXX, and reduces the likelihood of the errant agent using mobile telephones to transfer the codeword to the collaborator or directly to the remote telephone.

In a refinement to reduce further the likelihood of a fraudulent registration being set up through the use of mobile telephones by an errant agent and a collaborator, the host computer 26 sends a command to the PABX 10 for a speech synthesiser to generate "spoken" digits for connection to the extension which has called the extension XXXX. The agent hears the digits, either via the handset or via a loudspeaker facility, and immediately keys these digits on the keyboard of his computer terminal. This may be repeated one or more times with different digits being generated by the host computer. If the measured time difference between the time that the command is sent to the PABX 10 and the time that the agent enters the digits on the keyboard is more than a predetermined limit, then the registration procedure is recorded as invalid. This will reduce the likelihood of a fraudulent registration through the collaborator hearing the digits and relaying them to the agent. If the collaborator tries to avoid a relay delay by coupling his mobile telephone to the extension, i.e. providing a direct transmission to the mobile telephone of the agent, a further refinement provides that a sequence of such synthesised words randomly instructs the agent to enter digits via the telephone or the keyboard, e.g. "five, seven, keyboard"; "one, three, telephone". This makes it difficult for the collaborator, since to reduce the relay delay he needs to have good coupling between the extension receiver and the mobile transmitter, which reduces his ability to hear the instruction himself, as he may be required to enter the digits at that extension.

Because the time for which the called PABX extension, i.e. XXXX in the above examples, is in use for the registration procedure is only a few seconds, in a variant the host computer 26 refers to its internal record of the busy/free status of the PABX extensions, makes a random selection from the free extensions for use in the registration procedure, and commands the PABX 10 in respect of the selected extension in the same manner as described above for the extension XXXX. This will not inconvenience any agent at the selected extension since the PABX 10 will treat the call as answered and disconnect the ringing current generator before any, or any significant, audible sound can be produced at that selected extension.

The importance of having a secure registration of the working association of the extension and the computer terminal used by the agent is that in this type of CTI environment the agent makes a call by sending an instruction, including the desired destination number, to the host computer 26, which responds by sending an instruction containing that destination number and the extension number currently registered as being associated with the agent's computer terminal 24 to the PABX 10 to command it to make an external call to the destination number, and also to make a call to that extension number, and to join the two calls. Thus the agent is then in communication with the user at that destination number.

In variants, the host computer 26 commands the PABX 10 to make the external call using the agent's telephone terminal as originating terminal, and the destination number as recipient terminal, and in this way only a single call is made, as opposed to the "two call/joining" method described above.

If the host computer 26 is storing an erroneous association of telephone/computer, then the PABX 10 will ring an extension other than the one at which the agent is currently working. This erroneous association may arise through, for example, inadequate updating procedures and be entirely innocent. On the other hand, without the secure association process of the present invention, an agent would merely inform the host computer 26 of the extension of his telephone 22, and this provides an opportunity for deliberate or inadvertent misuse of the system. An example of this would be where an agent informs the host computer that he is currently working at extension ZZZZ, which is the extension of, say, the director of the company employing the agents. The agent could then instruct the host computer 26 to make a call to some national number, and the PABX 10 would then make the external call and a call to extension ZZZZ, and join the calls. Alternatively, as described herein, the PABX 10 can make a single call using the extension ZZZZ as the originating terminal.

The secure registration procedure of the present invention ensures that the host computer 26 stores the correct association. By providing the codeword to the computer terminal 24 at which the agent has logged on, it is reasonable to suppose that that agent, and no other person, can read the screen message and know that codeword. So even if that extension number XXXX becomes generally known, it will not be possible in normal use, for the agent to make the call to extension XXXX, and enter the code read from the screen, at any telephone other than the one adjacent to the agent's computer terminal 24. For increased security, the host computer 26 can send the message in two parts. In this case, a first part "Please dial extension XXXX." is displayed, and the host computer 26 will wait for a message from the PABX 10 that ringing current is being supplied to extension XXXX, and will then send the second part "When the call is answered, please enter via your telephone keypad the codeword YYYY.". In a variant the host computer 26 responds to that message from the PABX 10 in the normal manner by instructing the PABX 10 to record the line circuit as being off hook, and then sends the agent a second message part "Now please enter via your telephone keypad the codeword YYYY.".

It will be appreciated that the host computer 26 can generate the codewords using a one time pad, i.e. a pseudo-random process for generating a codeword. Such processes are well known and will not be described further.

For the situation of a teleworking agent, the host computer 26 is arranged to respond to initiation of a log on procedure by the teleworking agent via the keyboard of a computer terminal 38 at a workstation 21 to send to that computer terminal 38 data for a screen display containing the text message "Please dial destination number AAAA BBB XXXX. When the call is answered, please enter via your telephone keypad the codeword YYYY.".

The teleworking agent responds using a land-based telephone terminal, or a mobile telephone terminal, and the PABX 10 sends a message to the host computer 26 containing the digits received from the teleworking agent together with the CLI sent from the telephone terminal used by the teleworking agent.

In like manner, the host computer 26 compares these received digits with the code of the screen display, and if they match stores, i.e. registers, the CLI in association with the identity of the computer terminal 38 and sends a further screen display to the computer terminal 38 containing the text message "Please hang up.". The CLI and computer terminal identity are stored in respective fields of a registration record.

In a variant, the host computer 26 does not refer to stored information to make an assumption as to whether the agent is at a PABX extension or at a remote telephone, but sends a composite screen display "Please dial extension XXXX, or destination number AAAA BBB XXXX, as appropriate. When the call is answered, please enter via your keypad the security digits YYYY.".

In another variant, at the start of the registration procedure, the host computer 26 refers to the registration record for the computer terminal, reads any existing CLI stored in the CLI field, and generates a screen display to inform the agent of the last-registered CLI. Included in this screen display is the instruction to choose between options "Use existing registration" or "Change existing registration". If the user selects "Use existing registration", the registration procedure is not used. In a further variant, an alternative screen display is generated which informs the user of the existing registered CLI, and instructs the user to proceed with the registration procedure as verification of that registration.

If there is no existing CLI stored in the CLI field, this screen display is not generated, and the normal registration procedure is performed.

As just described, this method of registering the working association of a telephone terminal and a computer terminal is performed at log on of the agent, i.e. at the start of a working session. In variants, the registration is performed only if the agent indicates to the host computer 26 that he wants to make a call. Regardless of when registration is performed, it can be persistent or non-persistent. A persistent registration lasts until de-registration occurs either automatically upon termination of the current session, or when a de-registration command is entered or a new registration is performed. In this latter case, the registration is semi-permanent, and is changed only when, for example the agent currently associated with the workstation changes his mobile telephone and has a new number, or the workstation becomes associated with a different agent who registers his mobile telephone number instead of the out-of-date registration of the superseded agent.

If the telephone terminal 36 does not have a TouchTone dial, the teleworking agent can speak the digits of the codeword and the IVR 32 will perform voice recognition to identify the spoken digits and send them in digital form to the host computer 26. Instead of the IVR 32, an operator at an operator position of the PABX 10 can listen to the spoken digits and key them into an operator's keypad connected directly, or indirectly, to the host computer 26.

Whereas in the above-described embodiment the agent is instructed to make call to an extension of the PABX 10 at which the codeword will be received, it is not necessary for the switching system to be local to the agent, and it can be remotely situated. The CTI controller for the PABX can be local to the PABX, or remote and coupled to it via a data link.

Although the above description is in respect of a call centre, it will be appreciated that the invention is applicable to any CTI environment involving a computer terminal attached to a host computer.

The destination number which a user calls and sends the codeword to need not be an extension on a local PABX, or a remote PABX, but can be the number of an ordinary direct exchange line at which an intelligent terminal is connected, e.g. one having a CTI card. This terminal can be arranged to answer incoming calls automatically, to collect the CLI and the codeword, and to send a message via a data link back to the user's computer terminal. This data link can be a dedicated link via a data network, or via modems and the public switched telephone network.

Furthermore, the invention is not limited to outgoing calls made by user commands via the computer terminal, e.g. by keyboard entry or by clicking, in the usual manner with a mouse, on a number or name displayed on the screen of the computer terminal.

The registered association of the present invention can be used where the computer terminal is coupled to another such computer terminal via a data link. An example is where the computer terminals are connected for access to the Internet.

Assuming that a first user has performed a registration at his Web server of the working association of his telephone terminal and his computer terminal, and that subsequently he finds a Web page relating to a second user and containing a "Call Me" link, the "Me" in this sense meaning the first user. The first user clicks on the "Call Me" link, which causes his computer terminal, referred to as the first computer, to send a "Call Me" message to his Web server, referred to as the first server, containing the identity of the registered associated telephone terminal. The first server knows the identity, i.e. the network address, of the computer associated with the Web page, referred to as the second computer, and forwards the "Call Me" message to the second computer via a Web server, referred to as the second server, associated with the second computer.

On receipt at the second computer of the "Call Me" message, a screen display is generated to inform the second user that a telephone call to the displayed telephone number has been requested. The second user can now make a conventional call via his telephone terminal to that number. Alternatively, if the second user is associated with a CTI-enabled switching system, he can enter a make call command at the second computer to effect a call to that displayed telephone number. The first and second servers can be constituted by a single server, for example a server in the call centre of a mail order catalogue company. The first user can request Web pages from the call centre server and click on a "Call Me" button, thus sending a message to the server. The server notes the first user's computer identity, looks up the associated telephone number, and instructs the call centre's telephone system to call the user's telephone.

Another example of CTI environment other than a call centre is a conventional office, provisioned with a telephone terminal and a computer terminal, which does not in itself limit the user to any particular profession or work practice. The computer terminal has a telephone directory program which can be searched by the user, and when a desired telephone number has been found, the user will click his mouse button on the number. This will cause the digital data relating to the displayed number to be sent from the computer terminal, or from its host computer depending upon the arrangement, to a PABX serving the office. The PABX now acts, as described above, and makes a call from the number recorded by the host computer as associated with that computer terminal to the requested number.

In the above-described registration procedures the instructions are provided to the user by means of a screen display at his computer terminal. Instead, where a computer terminal has a sound card and loudspeakers, a speech synthesiser can be used to generate "spoken" instructions.

In the above-described embodiment of the present invention, the host computer 26 constitutes means to provide to a user of a computer terminal, via that computer terminal, the identity of a predetermined destination terminal number; means to provide to the user, via that computer terminal, a codeword; means to compare received data with the provided codeword; and means responsive to a match between the received data and the provided codeword to register the received identity of a telephone terminal in association with the identity of that computer terminal. Also, the PABX 10 constitutes means to receive data provided by the user via a telephone terminal, and means to receive the identity of a telephone terminal from which that call was made; and the PABX 10 together with the host computer 26 constitute means to answer a call made to that predetermined destination terminal number.

What is claimed is:

1. A method of registering the identity of a telephone terminal in association with the identity of a computer terminal, the method comprising:

providing to a user of the computer terminal, via that computer terminal, the identity of a predetermined destination terminal number;

answering a call made to that predetermined destination terminal number;

receiving at that predetermined destination terminal number the identity of a telephone terminal from which that call was made;

providing to the user, via that computer terminal, a codeword;

receiving at that predetermined destination terminal data provided by the user via that telephone terminal;

comparing the received data with the provided codeword; and if there is a match, registering the identity of that telephone terminal in association with the identity of that computer terminal.

2. A method as claimed in claim 1, wherein providing the identity of a predetermined destination terminal number is performed upon detection of a make call command made via that computer terminal.

3. A system for registering the identity of a telephone terminal in association with the identity of a computer terminal, the system comprising:

means to provide to a user of the computer terminal, via that computer terminal, the identity of a predetermined destination terminal number;

means to answer a call made to that predetermined destination terminal number;

means to receive the identity of a telephone terminal from which that call was made;

means to provide to the user, via that computer terminal, a codeword;

means to receive data provided by the user via that telephone terminal;

means to compare the received data with the provided codeword; and means responsive to a match between the received data and the provided codeword to register the received identity of that telephone terminal in association with the identity of that computer terminal.

4. A system as claimed in claim 3, and wherein the means to provide the identity of a predetermined destination terminal number is arranged to provide said identity of a predetermined destination terminal number upon detection of a make call command invoked by the user.

5. A system as claimed in claim 3, and wherein:

the means to provide the identity of a predetermined destination terminal number, the means to provide to the user, via that computer terminal, a codeword, the comparing means, and the registering means together constitute a subsystem; and the answering means, the means to receive the identity of a telephone terminal, and the means to receive data provided by the user together constitute a separate subsystem.

* * * * *